No. 801,204. PATENTED OCT. 10, 1905.
F. BAUM.
METHOD OF AND APPARATUS FOR TREATING COAL, ORES, AND OTHER MINERALS FOR DRAINING THEM OF WATER.
APPLICATION FILED FEB. 23, 1904.
3 SHEETS—SHEET 3.
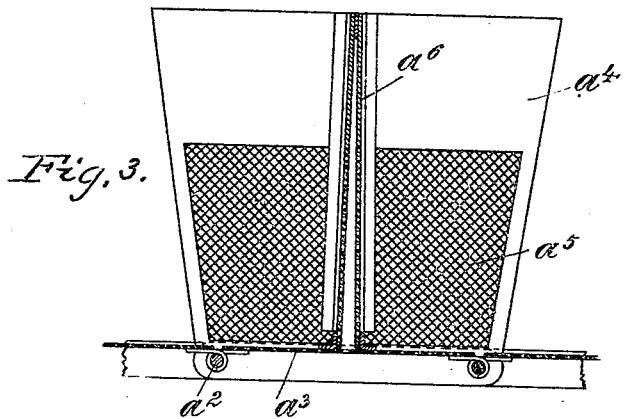
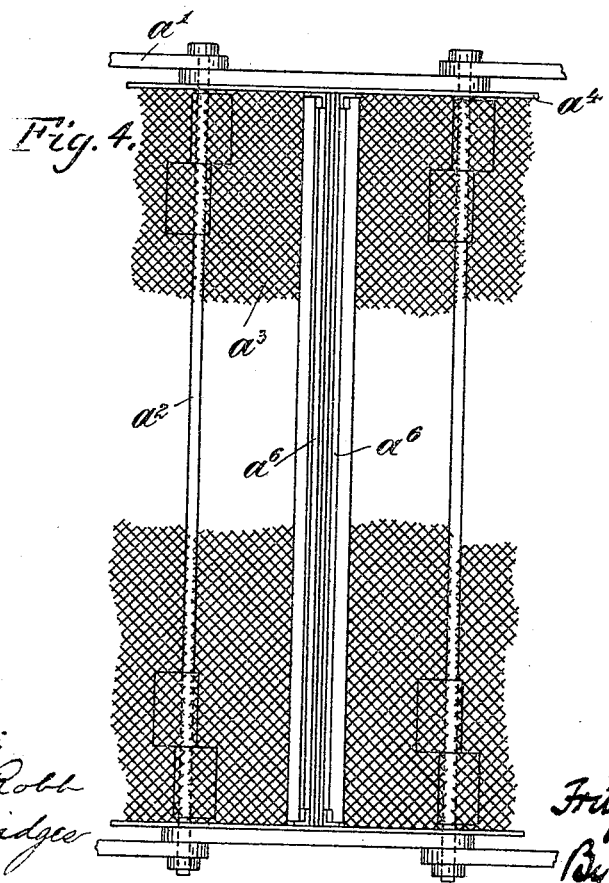

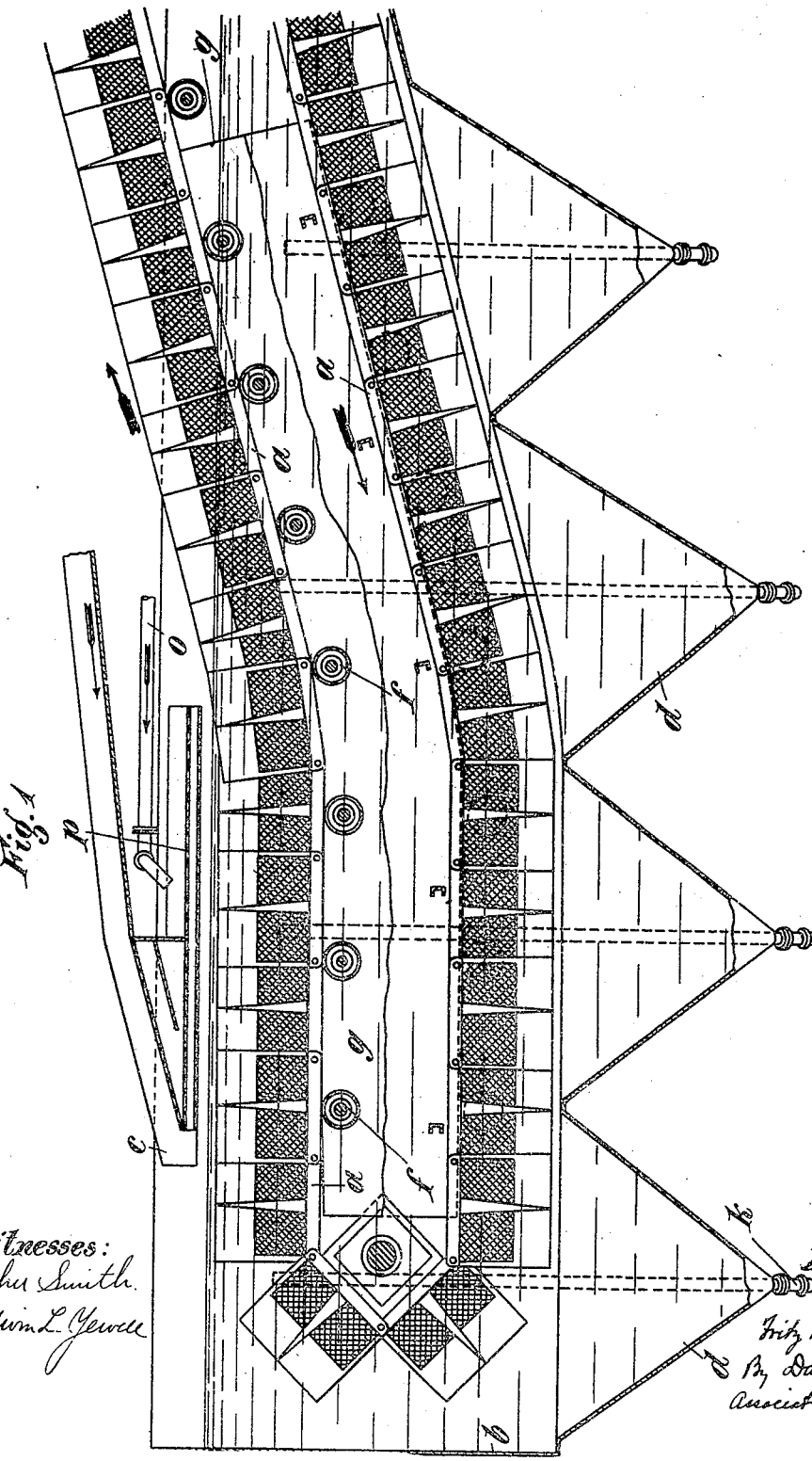

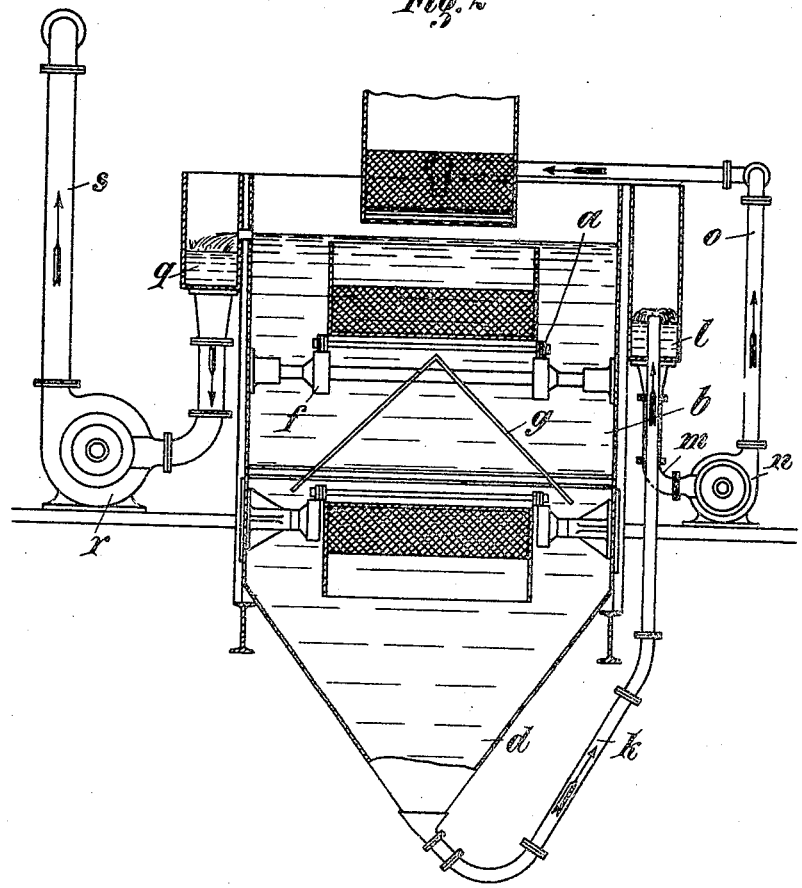

UNITED STATES PATENT OFFICE.

FRITZ BAUM, OF HERNE, GERMANY.

METHOD OF AND APPARATUS FOR TREATING COAL, ORES, AND OTHER MINERALS FOR DRAINING THEM OF WATER.

No. 801,204.     Specification of Letters Patent.     Patented Oct. 10, 1905.

Application filed February 23, 1904. Serial No. 194,842.

*To all whom it may concern:*

Be it known that I, FRITZ BAUM, manufacturer, a subject of the King of Prussia, German Emperor, residing at Herne, in the Kingdom of Prussia, German Empire, have invented a new and useful Method of and Apparatus for Treating Coal, Ores, and other Minerals for Draining them of Water, of which the following is a specification.

This invention relates to an improved method of and apparatus for treating coal, ores, and the like that have been subjected to a washing process for draining off the water therefrom.

The invention is mainly based upon two known methods of treatment—namely, the conveying of the wet coal by means of a transporting-belt provided with buckets for receiving the coal and the discharge of the coal coming from the settling apparatus into a practically quiescent large body of water, so that the coal sinks down comparatively slowly in the water, so as to form a loose deposit.

According to the present invention the transporting-belt is made to travel in an inclined position through the said quiescent body of water, so that the most deeply immersed portion thereof is in a position to receive into its buckets the coal descending slowly through the water, the transporting-belt being then made to travel upward and out of the water for conveying the charge of coal away while the water drains from the buckets. The proportion between the size and speed of the buckets and the volume of coal supplied is so determined that the buckets are practically just filled with coal as they pass along, thus subjecting the layer of coal to only a definite moderate degree of pressure by its own weight and insuring a comparatively loose condition of the charges in the buckets, and consequently facilitating the discharge of the water therefrom as the buckets emerge from the water with the transporting-belt. The water draining off from the buckets of the transporting-belt falls back into the said body of water and is clarified therein, the tank containing such body being made of such a width relatively to the width of the transporting-belt as to leave a substantial surface of water on each side. The sludge descending from the coal discharged into the water collects at the bottom of the tank, whence it is withdrawn and again discharged in a uniformly-distributed manner onto the body of coal that has been filled into the buckets. At the same time the clarified water passes off from the top of the tank and is conveyed back to the settling-tank of the washing apparatus.

On the accompanying drawings is shown, by way of example, a construction of apparatus for carrying out the above-described method of operating.

Figure 1 shows a longitudinal section, and Fig. 2 a cross-section, of the same. Fig. 3 is an enlarged vertical sectional view of the conveyer-chain, and Fig. 4 a plan view of a portion thereof.

The transporting-belt $a$, with its buckets, is of known construction. The belt is formed of the links $a'$, which are hinged together by means of transverse rods $a^2$. To these rods are connected the wire-netting bottom pieces $a^3$. To the links are secured the side pieces or cheeks $a^4$, which are perforated over a portion of either surface, as at $5^a$, to conform to the meshes of the netting forming the bottom of the buckets. The opposite side pieces are connected by transverse partition-walls $a^6$, which are separated from each other slightly, as shown clearly in Fig. 3. These partition-walls are perforated to permit water to escape through them and from the coal contained in the buckets. The buckets are formed by two side cheeks that overlap the ends of the side cheeks of the contiguous buckets, and a transverse partition is provided in the middle of the side cheeks, so that a closed receptacle is constituted by the contiguous ends of two buckets between the two transverse partitions, while when the buckets separate in passing round the guide-roller, as shown at the left-hand end of Fig. 1, they are constituted by two side cheeks open at the ends with the partition in the middle. The side cheeks, as also the bottom surface to which they are fixed, are perforated for allowing the free escape of the water from the charge of coal when the buckets emerge from the tank $b$. The transporting-belt is in an inclined position as it passes into and out of the tank, so that the left-hand end of its upper part is immersed below the level of the water, being supported by rollers $f$, carried by the sides of the tank. The bottom of the latter is formed by a series of funnel-shaped pockets $d$. A lateral overflow is provided at $e$, discharging into a trough $q$, for maintaining the water always at the same level. Below the upper part of the transporting-belt an angular shield $g$ is provided in the tank, by means of which the sludge descending from the buckets is deflected to either side, so as not to deposit upon the lower part of the belt, being made to fall along the inclined sides of the pockets $d$, to the bottom thereof. The small coal passes together with the washing-water from the settling-tanks of the washing-machine along the chute $c$, whence it falls into the buckets of the belt $a$. By the action of gravity the coarser particles of coal form the bottom layer in the buckets, the successive layers being of gradually-increasing fineness, and owing to this peculiar stratification, combined with the looseness with which the layers are formed, the water drains off from the charge with great rapidity as soon as the buckets emerge from the water in the tank, such draining being also facilitated by the comparatively small depth of the layers.

As before stated, the tank $b$ is made of such a width as to afford a sufficiently large surface of water to constitute in itself a clarifying-sump. The greater part of the finest coal separates already on the entrance of the mixed mass into the water in the buckets, and during the descent through the water the other degrees of fineness separate from each other, forming successive layers, as above described. The finest particles and sludge that do not pass into the buckets collect at the bottom of the pockets $d$, and by the greater head of water in the tank $b$ they are forced through a pipe $k$ into a trough $l$ at the side arranged at a lower level, whence the water charged with these fine particles is led by a pipe $m$ to a small centrifugal pump $n$, by which it is raised through a pipe $o$ and discharged onto the sieve or perforated bottom $p$ of the supply-chute $c$, so that in falling through the sieve the said finest particles and sludge are distributed as a top layer over the charges in the buckets.

The clarified water escaping through the overflow $e$ into the trough $q$ is withdrawn thence by a large centrifugal pump $r$ and conveyed through a pipe $s$ back into the settling-tanks of the washing-machine.

Owing to the peculiar method of charging the buckets of the belt with the small coal while under water, the clarifying of the water in the tank is so perfect and rapid and the deposit of the fine coal and sludge so uniform that the amount of clarifying-surface for the washing-water in the tank can be considerably less than heretofore, and with the described additional width of the tank the employment of special clarifying-sumps is rendered unnecessary. The first cost of the installation is therefore reduced, the supervision is simplified, and the height to which the water has to be pumped is reduced, resulting in a corresponding reduction of the working expenses.

Having thus described the nature of my said invention and the best means I know of carrying the same into practical effect, I claim—

1. Method of treating washed coal and the like for draining the water therefrom, which consists in charging the washed coal into the draining-buckets of a transporting-belt by causing it to descend through a quiescent body of water in which the said buckets are immersed at one point of their travel whereby the coal is deposited loosely in the buckets so as to facilitate subsequent drainage, the washing-water accompanying the coal being at the same time clarified in the said body of water by the settlement of the sludge therefrom, and the deposited sludge being conveyed from the body of water into the buckets after these have received their charge of coal while the clarified water is conveyed back to the washing apparatus, substantially as described.

2. In apparatus for treating washed coal and the like for draining the water therefrom, a tank adapted to contain a quiescent body of water maintained at a constant level by an overflow, a transporting-belt carrying draining-buckets immersed in said body of water at one point of their travel, means for charging the washed coal into said buckets while they are immersed in said body of water, and an angular shield arranged below the upper part of the transporting-belt, adapted to deflect the sludge descending from the coal-supply toward the sides of the tank, substantially as described.

3. An apparatus for treating washed coal comprising a tank adapted to contain a quiescent body of water of sufficient volume to make the tank serve as a sump for clarifying the returning wash-water, a transporting-belt carrying draining-buckets and passing through the tank below the water-level for a portion of its travel, means above the water-level for charging coal into said tank, said charging means terminating above the water whereby the coal will pass through the water to the charging-buckets, and the heavier pieces of coal will arrange themselves in the bottom of the buckets with the lighter pieces on top of said heavier pieces, means to permit an overflow from said tank, means for collecting the sludge at the bottom of said tank, and means to permit the sludge to be forced from the tank by the pressure of the water contained therein.

4. In apparatus for treating washed coal and the like for draining the water therefrom, a tank adapted to contain a quiescent body of water of sufficient volume to make the tank serve as a sump for clarifying the entering wash-water, a transporting-belt carrying draining-buckets, passing through the tank below the water-level for a portion of its travel, means for charging the washed coal through the water to the buckets, and means for withdrawing the deposited sludge from the bottom of the tank and conveying it onto the top of the charges of coal in the buckets, substantially as described.

5. In apparatus for treating washed coal and the like for draining off the water therefrom, a tank adapted to contain a quiescent body of water maintained at a constant level by an overflow, funnel-shaped pockets at the bottom of said tank, a trough at the side of said tank situated below the water-level thereof and communicating by pipes with the bottom of said pockets so that the water is forced from the latter into the trough by the head of water in the tank, a transporting-belt carrying draining-buckets immersed in said body of water at one point of their travel, means for charging the washed coal into said buckets while they are immersed in said body of water, and means for conveying the water and sludge that passes into said trough from the bottom of the tank onto the top of the charges of coal in the draining-buckets of the conveying-belt, substantially as described.

In witness whereof I have hereunto set my hand in presence of two witnesses.

FRITZ BAUM.

Witnesses:
 WILLIAM ESSENWEIN,
 PETER LIEBER.